US007165097B1

(12) United States Patent
Mackin et al.

(10) Patent No.: US 7,165,097 B1
(45) Date of Patent: Jan. 16, 2007

(54) SYSTEM FOR DISTRIBUTED ERROR REPORTING AND USER INTERACTION

(75) Inventors: Paul F. Mackin, Manchester, NH (US); David E. Rowlands, Leominster, MA (US); Luk S. Ho, Nashua, NH (US); Robert C. Donat, Brookline, NH (US); Chung Y. Cheng, Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 469 days.

(21) Appl. No.: 09/667,648

(22) Filed: Sep. 22, 2000

(51) Int. Cl.
*G06F 15/16* (2006.01)
*G06F 11/00* (2006.01)

(52) U.S. Cl. ............... 709/218; 709/203; 709/208; 714/4; 714/57

(58) Field of Classification Search ........ 709/201–203, 709/208, 223–225, 216–219; 714/57, 4, 714/13, 38
See application file for complete search history.

(56) References Cited

U.S. PATENT DOCUMENTS

| | | | | |
|---|---|---|---|---|
| 6,178,529 B1 * | 1/2001 | Short et al. | ............ | 714/51 |
| 6,243,825 B1 * | 6/2001 | Gamache et al. | ............ | 714/4 |
| 6,269,378 B1 * | 7/2001 | Quirt | ............ | 707/103 R |
| 6,292,905 B1 * | 9/2001 | Wallach et al. | ............ | 714/4 |
| 6,298,377 B1 * | 10/2001 | Hartikainen et al. | ............ | 709/223 |
| 6,353,898 B1 * | 3/2002 | Wipfel et al. | ............ | 714/48 |
| 6,421,787 B1 * | 7/2002 | Slaughter et al. | ............ | 714/4 |
| 6,446,219 B1 * | 9/2002 | Slaughter et al. | ............ | 714/4 |
| 6,536,000 B1 * | 3/2003 | Jackson et al. | ............ | 714/57 |
| 6,594,786 B1 * | 7/2003 | Connelly et al. | ............ | 714/50 |
| 6,615,258 B1 * | 9/2003 | Barry et al. | ............ | 709/223 |
| 6,631,402 B1 * | 10/2003 | Devine et al. | ............ | 709/217 |
| 6,691,244 B1 * | 2/2004 | Kampe et al. | ............ | 714/4 |

OTHER PUBLICATIONS

Microsoft Windows NT Server 4.0, Enterprise Edition—Clustering Overview, Microsoft Corporation (2000).
Microsoft Windows NT Server 4.0, Enterprise Edition—Clustering Architecture, Microsoft Corporation (2000).
The Component Object Model: A Technical Overview "http://msdn.microsoft.com/library/techart/msdn_comppr.htm" (2000).
COMponents, "http://msdn.microsoft.com/library/techart/msdn_components.htm" (2000).

* cited by examiner

*Primary Examiner*—Glenton B. Burgess
*Assistant Examiner*—Yasin Barqadle
(74) *Attorney, Agent, or Firm*—Chapin IP Law, LLC; Barry W. Chapin, Esq.

(57) ABSTRACT

On a computer cluster, a distributed object, called a console, manages all interactions with users and manages error reporting. The console provides a simple synchronous call interface that does not use any network semantics. This allows all layers of the software to use the console.

User interaction and error reporting is enhanced by an error stack, included in the console. The error stack can be maintained on a per client context basis. When an error occurs, each layer of software can add details to the error stack. The result is the relaying meaningful error messages to the user.

19 Claims, 12 Drawing Sheets

SYSTEM FOR DISTRIBUTED ERROR REPORTING AND USER INTERACTION

BACKGROUND

Increasingly, businesses expect products and services to be available 24 hours a day, 365 days a year. In an effort to insure maximum availability, cluster technology can reduce or minimize the down times of databases and other applications. In a common distributed system, the applications run on Microsoft clusters and are configured with Microsoft Cluster Server (MSCS) software.

A cluster is a configuration of two or more independent computing systems, called cluster nodes, that are connected to the same disk subsystem. The cluster nodes are joined together through a shared storage interconnect, as well as an internode network connection. In a cluster, each server (node) typically has exclusive access to a subset of the cluster disk during normal operations. As a distributed system, a cluster can be far more effective than independent stand-alone systems, because each node can perform useful work yet still be able to take over the workload and disk resources of a failed cluster node. When a cluster node fails, the cluster software moves its workload to the surviving node based on parameters that are configured by a users. This operation is called a failover.

The internode network connection, sometimes referred to as a heartbeat connection, allows one node to detect the availability or unavailability of another node. If one node fails, the cluster software fails over the workload of the unavailable node to the available node, and remounts any cluster disks that were owned by the failed node. Clients continue to access cluster resources without any changes.

In a cluster environment, the user typically interacts with a specific node, while user processes may be running on another node. Complicated techniques have been used to relay error information back to the user. That information, however, tends to be minimal.

SUMMARY

Because a process may be running on a node several hops away from the user interface, the process need to route messages back to the user interface when that process needs to interact with the users or report an error. A particular solution is to use a distributed object to manage all interactions with the user and to manage error reporting.

As a distributed system, a fail safe server can detect and report errors in detail. Furthermore, error messages can have context so that the user can deduce the exact nature of a problem. This is difficult to do using a single error status. For example, the "object not found" error is meaningless unless accompanied by information such as the object name, object type, computer name, facility accessing the object, the operation in progress, etc. A particular distributed error handling system solves the above problem by providing an interface for reporting errors that can be accessed easily from anywhere in the server.

A particular embodiment includes a system and method for interacting with a client in a distributed computing environment having a plurality of computing nodes interconnected to form a cluster. The method can include connecting a client to a master node of the cluster. This can include, on the master node, establishing an object unique to the client for interfacing with the client. That object may be accessible across the cluster as a distributed object, in particular using a Component Object Model (COM) interface.

A message list can then be associated to the client on the master node. The message list can be structured as a stack. A client manager can be used to maintain the list on a client basis. The client manager can furthermore track a plurality of contexts for the client, each context having a respective message list.

Tasks can performed for the client on a plurality of nodes of the cluster. While performing one of the tasks, an event may be detected. The event may include an error condition or an interaction (dialogue) request. Furthermore, the event may be detected on a node different from the master node. In response, a message can be stored on the message list that is descriptive of the detected event. The message can be either a message code or a message string.

The message is then communicated to the client. This may include formatting a message code into a message string. In particular, the message is communicated through the distributed object.

The system and method can be particularly used in a failover situation, including failing over the master node to another node.

BRIEF DESCRIPTION OF THE DRAWINGS

The foregoing and other objects, features and advantages of the system will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An embodiment of the invention includes a fail safe server and a fail safe manager for managing failovers. The fail safe server works with the Microsoft Cluster Server (MSCS) software to configure fast, automatic failover during planned and unplanned outages for resources that have been configured for high availability. These resources can be a database server, a forms server, a report server, a web server, or other Windows services (as well as a software and hardware upon which these items depend). Also, the fail safe server can attempt to restart a failed software resource so that a failover from one cluster node to another may not be required. A fail safe manager provides an interface and wizards to help a user configure and manage cluster resources, and trouble shooting tools that help the users diagnose problems. Together, these components enable rapid deployment of highly available database, application, and internet business solutions.

Fail safe components works with MSCS to configure both hardware and software resources for high availability. Once configured, the multiple nodes in the cluster appear to end users and clients as a signal virtual server; end users and client applications connect with single, fixed network address, called a virtual address, without requiring any knowledge of the underlying cluster. Then, when one node in the cluster becomes unavailable, MSCS moves the workload of the failed node (and client requests) to the remaining node. A particular fail safe server is embodied in Oracle Fail Safe, releases 3.0.3 and 3.0.4, commercially available from Oracle Corporation of Redwood Shores, Calif.

Figure 1:
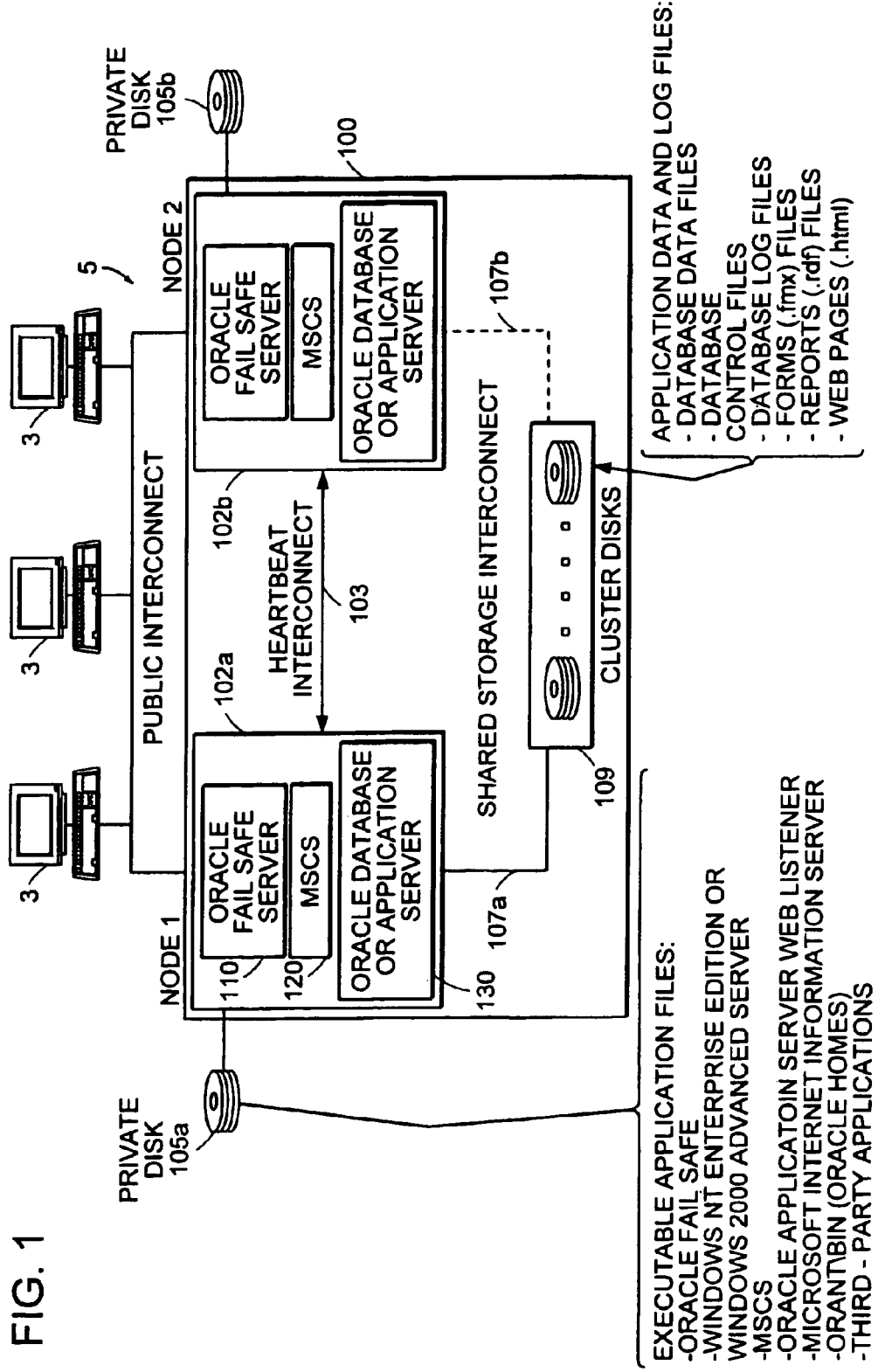
FIG. 1 is a schematic block diagram of hardware and software components in a cluster configured with the fail safe system.

FIG. 1 is a schematic block diagram of hardware and software components in a cluster configured with the fail safe system. A plurality of client computers 3 are interconnected to a cluster 100 via a public interconnect 5.

As shown, the cluster 100 includes two nodes, a first node 102A and second node 102B. Each node includes an instance of a fail safe server system 110, MSCS 120 and one or more application database or application server programs 130.

A heartbeat interconnect 103 connects the two nodes so that a failure of one node can be detected by the remaining node. As also shown, each node can have a respective private disks 105A, 105B. The private disks store the executable application files for each cluster node.

Application data and log files are stored on a cluster disk 109. The cluster disk 109 can include a plurality of physical disks, including RAID disks. The cluster disks 109 are configured as shared storage, with each node having a respective shared storage interconnect 107A, 107B to the cluster disk 109.

Figure 2:
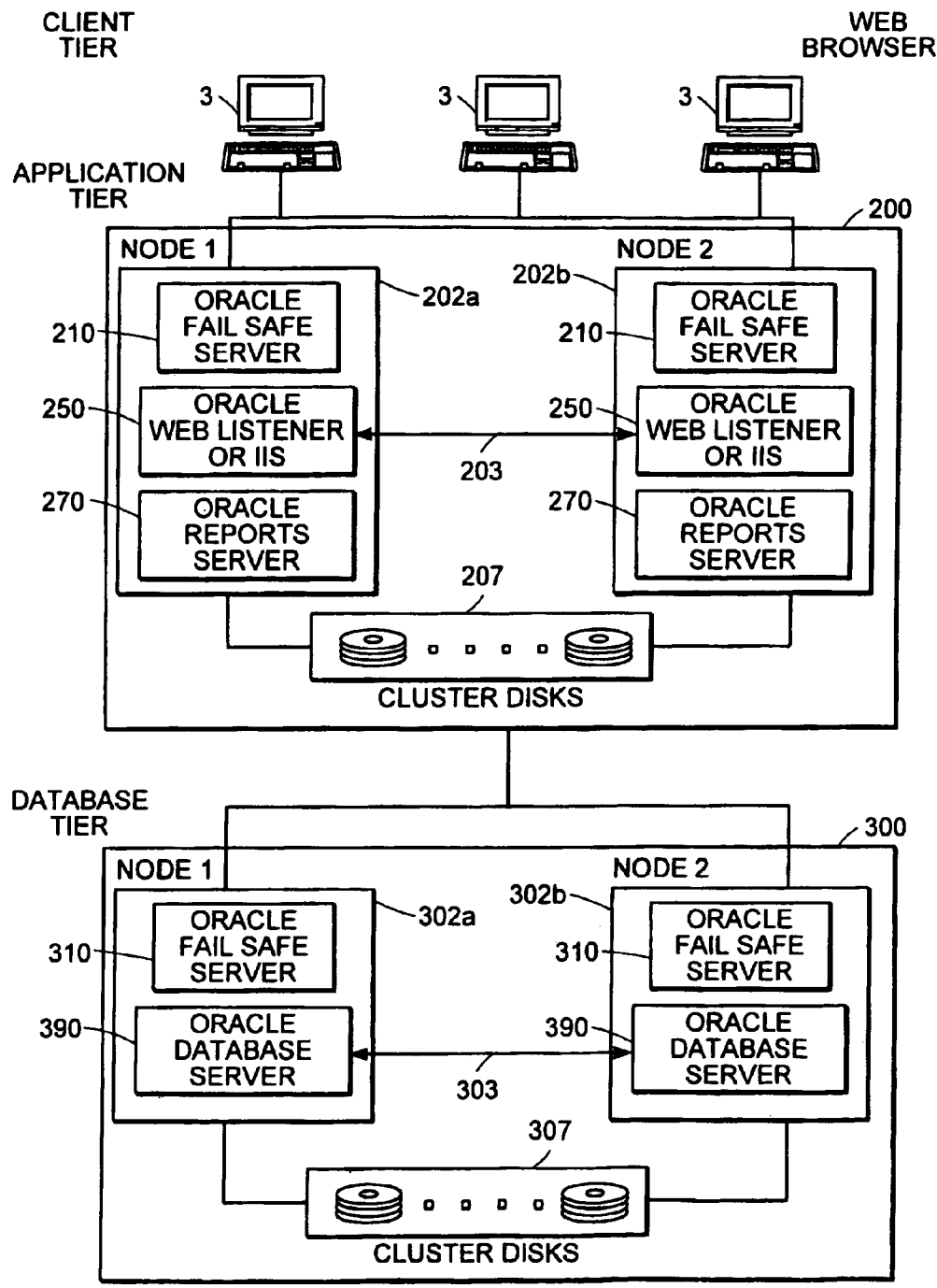
FIG. 2 is a schematic block diagram of a multi-tiered cluster system.

FIG. 2 is a schematic block diagram of a multi-tiered cluster system. As shown, a client tier includes a plurality of client computers 3, which can be operating web browsers, for example. An application tier 200 and a database tier 300 are clusters accessed by operation of the client computers 3.

The application tier cluster 200 includes a plurality of nodes 202A, 202B. Each node is interconnected by a heartbeat interconnect 203. The nodes share cluster disks 209, as described above. Each node can operate an instance of, for example, a fail safe server 210, a web listener 250, and a report server 270.

The database tier cluster 300 includes a plurality of nodes 302A, 302B. As above, a heartbeat interconnect 303 is operated between the nodes and cluster disks 309 are shared by the nodes. As shown, the nodes run an instance of a fail safe server 310 and a database server 390. In a particular embodiment, the database is Oracle8i, commercially available from Oracle Corporation.

One problem with distributed systems is that a process may be running on a node several hops away from the user interface. If that process needs to interact with the users or report an error, then it must route messages back to the user interface. A particular solution is to use a distributed object to manage all interactions with the user and to manage error reporting.

The distributed object is referred to as a console. When the user makes a request to the master server, then a console is created for that specific request. All objects, local or remote, that are instantiated to carry out the request have access to a console interface pointer. Thus, any component of the distributed system can easily report errors or have a dialogue with the user.

The fail safe server, which runs on all nodes of the cluster, is responsible for managing a node failover. The server coordinates and manages all cluster-wide configurations and verification work, and provides basic cluster services. Furthermore, the server provides console, error reporting and data exchange services on behalf of external resource providers. These features enable third party plug-ins to concentrate on the fail safe business logic of their product without worrying about the distributed nature of the product.

Figure 3:
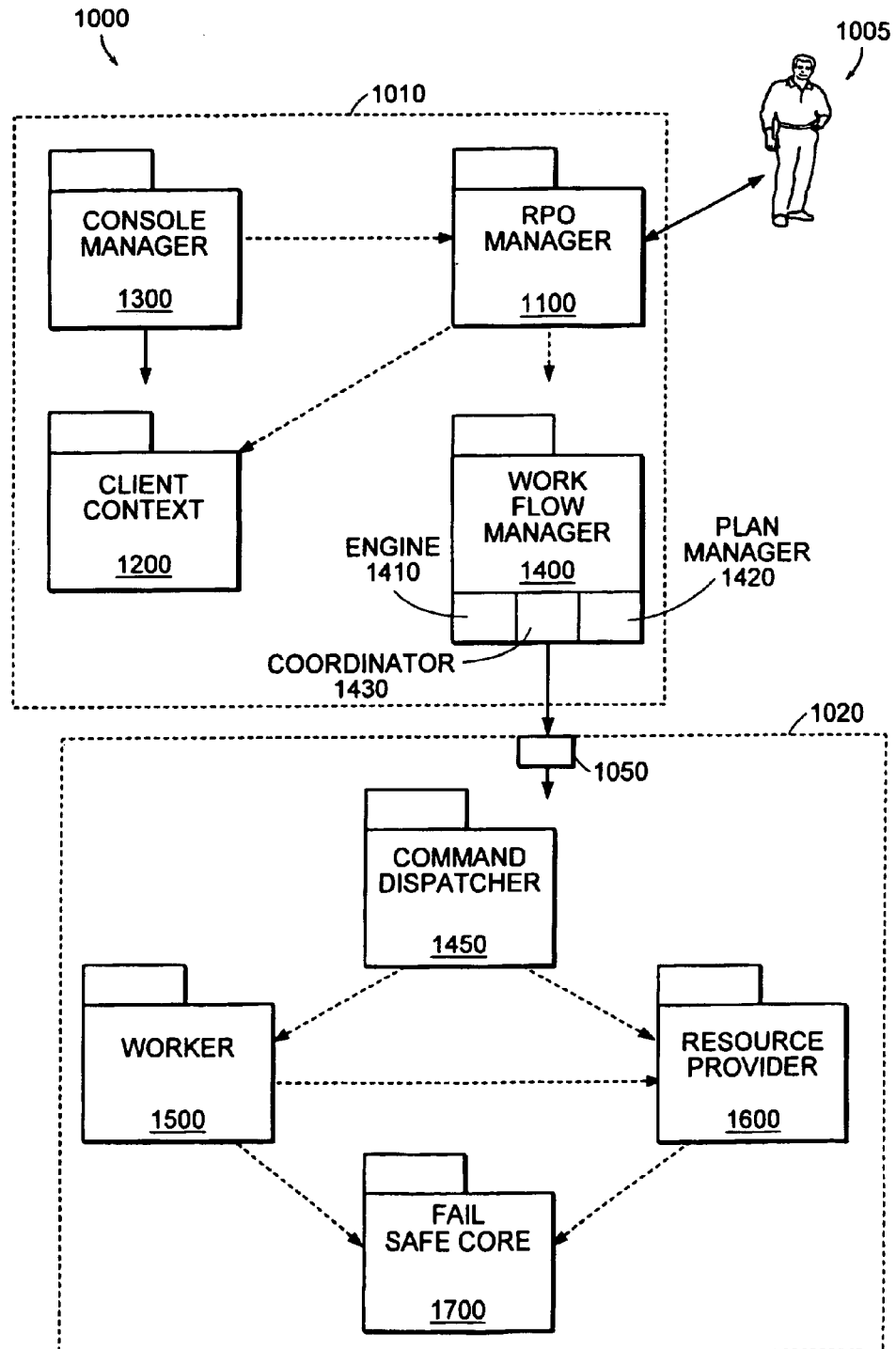
FIG. 3 is a block diagram showing a high level package-level view of a particular fail safe server.

FIG. 3 is a block diagram showing a high level package-level view of a particular fail safe server. Shown is a server front-end component 1010 and a server back-end component 1020. The server exposes services in the form of Component Object Model (COM) interfaces at both the front end and the back end. The front-end management services provide a high level interface to manage the entire cluster. In particular, the server front-end component 1010 interfaces with a fail safe manager 1005 and handles client interactions, error handling, console management, and workflow management. The back end user services are lower level interfaces used to support resource providers. In particular, the server back-end (or worker) component 1020 dispatches a command and executes it.

In the server front-end component 1010, a Remote Procedure Call (RPC) manager package 1100 handles interaction with the fail safe manager 1005. A client context package 1200 keeps track of client session information. A console manager package 1300 handles console request from the server, interacting with both an error stack (in the client context package 1200) and the RPC callback layer.

The fail safe server 1000 also includes a workflow package 1400 having an engine 1410, plan manager 1420, and coordinator 1430. The engine 1410 processes requests from the client and determines from the plan manager 1020 the list of workers needed to service the request. The engine 1410 passes the request along with the worker list to the coordinator 1430, which executes the client request using the workers to perform tasks. The workers use the resource providers 1600 and fail safe core 1700 as needed. The fail safe core 1700 is a library of support routines used by various parts of the server.

To accomplish the tasks, the coordinator 1430 sends a command to a command dispatcher 1450 by way of the back-end component 1020. The back-end component 1020 has an interface function 1025, called DoXmlCommand ( ), which is called by the coordinator 1430. The dispatcher 1450 examines the command and processes it, by either (1) calling a worker object; (2) calling a fail safe resource provider; or (3) calling the fail safe core. For example, if a request is to online a group, then the core is called; if a request is to get resource specific data (such as database properties), then the request is passed to the resource provider, and if a request is to perform a cluster-wide operation (such as verify cluster), then the request is passed to a worker object.

Figure 4:
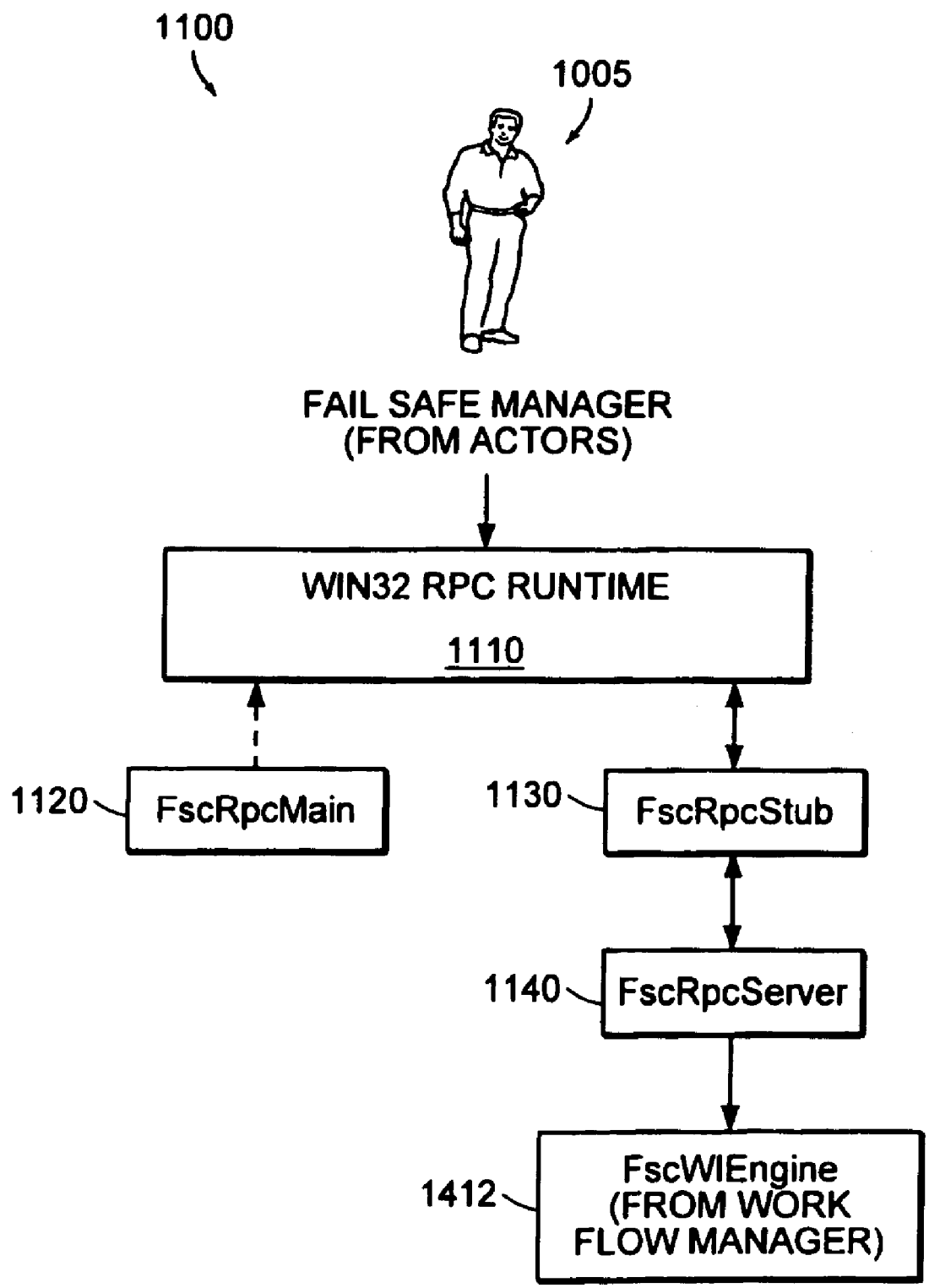
FIG. 4 is object class diagram of the RPC manager package of FIG. 3.

FIG. 4 is object class diagram of the RPC manager package of FIG. 3. The RPC manager 1100 handles all direct interaction with the fail safe manager client 1005. The RPC manager 1100 includes a Win32 run-time component 1110. The RPC manager 1100 also includes a main setup class 1120, stub class 1130, an RPC server class class 1140, and a work flow engine class 1412.

The main RPC class 1120 is responsible for initializing the fail safe server 1000 with the RPC run time code 1100. The server is set up to listen on multiple protocols using dynamic endpoint mapping so that the client connects using a Globally Unique Identifier (GUID), specifying an interface identifier. The server also configures the RPC code to create a new thread for each client connection. Once the server has done RPC initialization, it is ready to accept client requests.

the RPC stub 1130 contains all of the entry points into the server for the client. The stub 1130 creates the RPC server 1140 to process the request. The stub 1130 calls the RPC Server 1140 to create the console and call context, both of which are needed during the lifetime of the request. Next, the stub 1130 calls the RPC Server 1140 to execute the request. The RPC Server 1140 convertS the data sent by the client from text into an internal structure which is then passed down to the engine 1412. Likewise, when the request has been completed by the engine 1412, RPC Server 1140 converts the results form the internal format to text which is then returned to the client.

Figure 5:
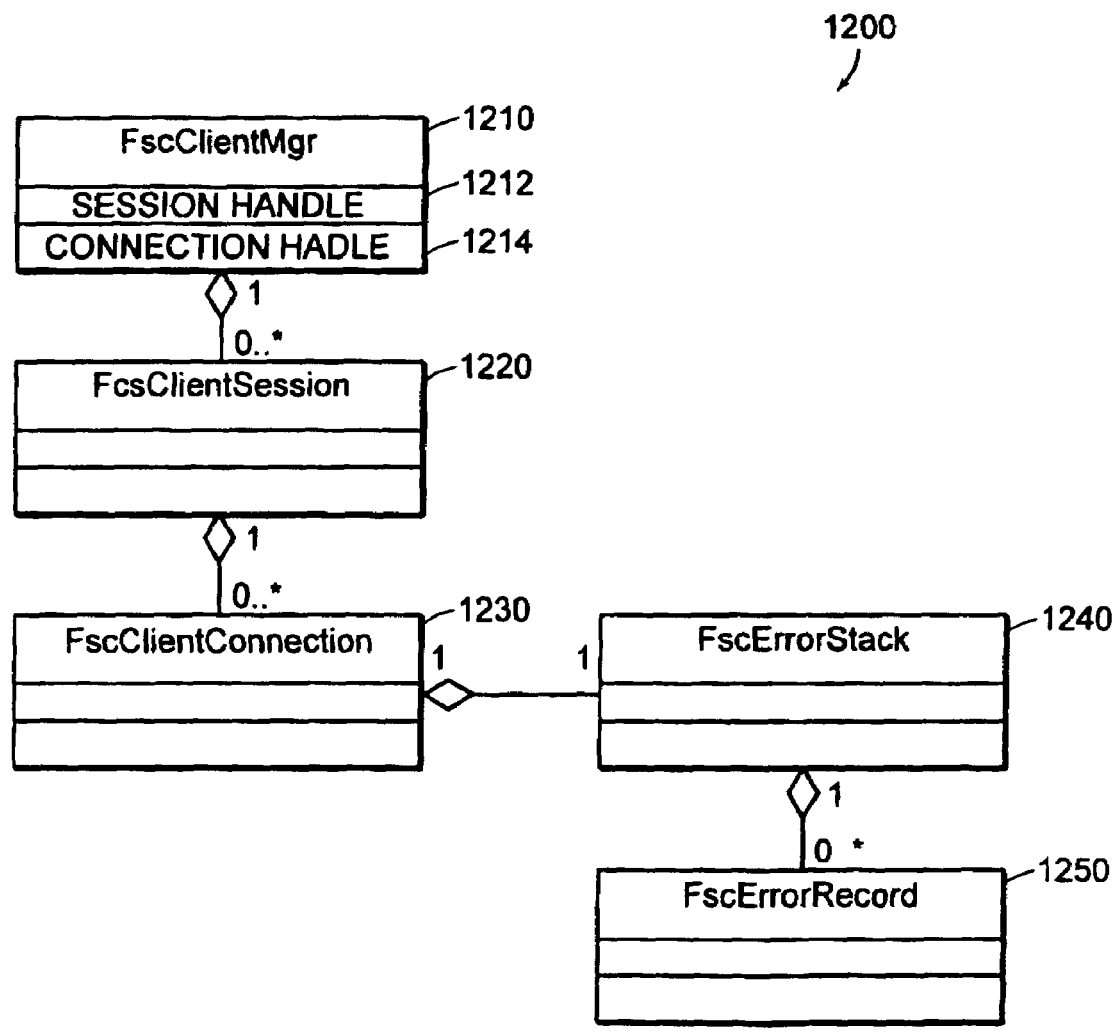
FIG. 5 is an object class diagram of the client context package 1200 of FIG. 3.

FIG. 5 is an object class diagram of the client context package 1200 of FIG. 3. The client context package 1200 is responsible for managing all client connections and maintaining an error stack which accumulates errors for a given fail safe operation. A client manager class 1210 includes a list of all client sessions 1220, which in turn includes a list of client connections 1230 for each session. Each client connection corresponds to a RPC bind by the client, that is, a logical link between the client and the server. Each connection includes an error stack 1240, which has a list of error records 1250.

The client connection class 1230 manages a single client logical link to the server as a result of the client RPC bind. This session is also very light weight and is mainly used as a container for the error stack 1240.

Before a client can use the server, it must create a session that represents the user who is logged on. The client session class 1220 manages the user authentication and authorization. This class maintains the list of all connections 1230 within the session.

The client manager class 1210 keeps overall track of client connections and session. There can be a single client manger for the entire server process. The client manager 1210 includes two maps, a session handle map 1212 and a connection handle map 1214. Session and connection handles passing between the client and server are mapped to objects by the client manager 1210.

The client manger class 1210 also performs house cleaning duties, namely cleaning up after clients that abort their logical link. When the server starts up, the client manager 1210 creates a background thread, the sole purpose of which is to check if a client session is valid. Periodically (for example, every minute or so), the client sends a keep-alive message to the server. At scheduled intervals, the server wakes up and destroys any session and connections that are stale.

Figure 6:
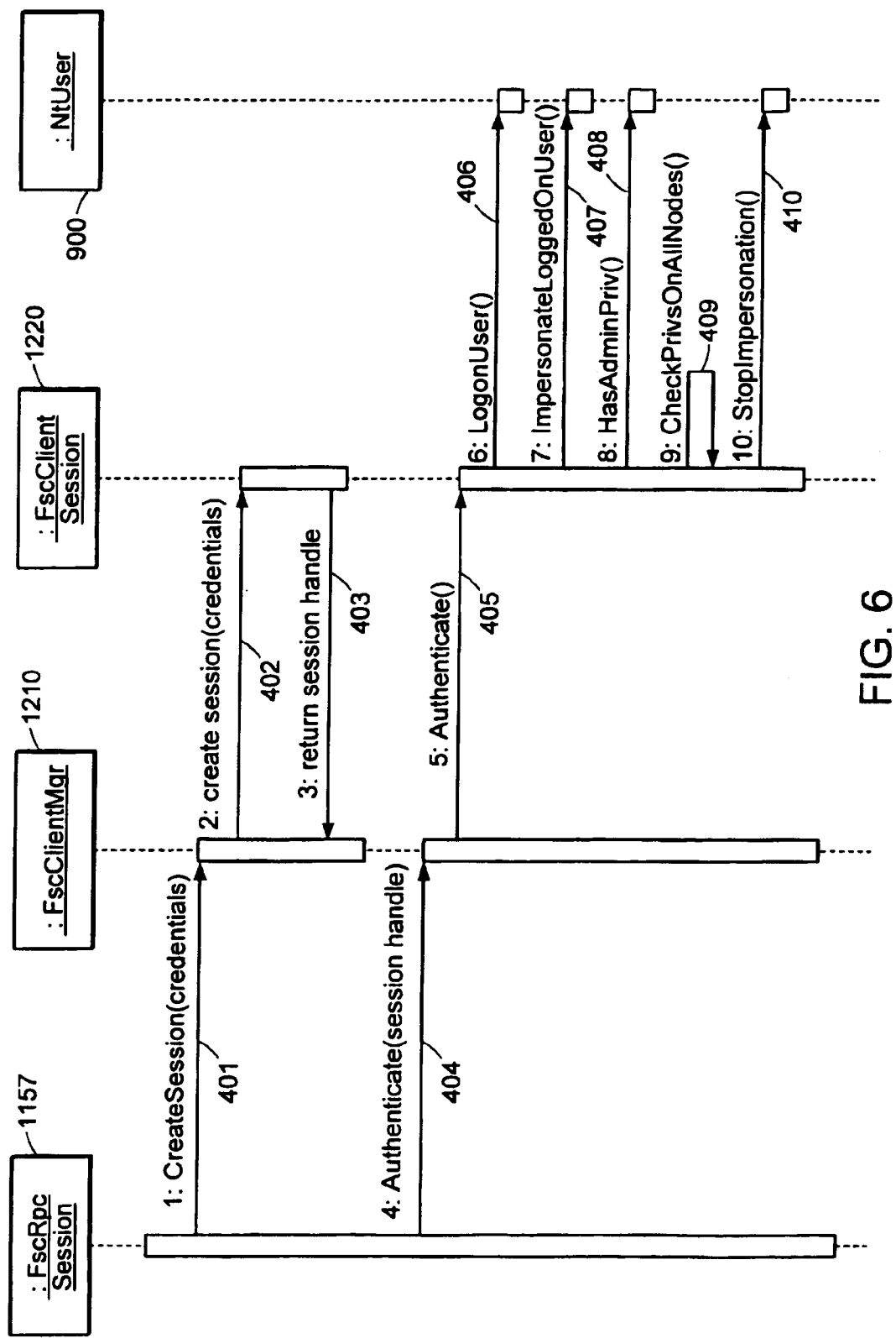
FIG. 6 is a flow diagram illustrating user authentication.

FIG. 6 is a flow diagram illustrating user authentication. The fail safe server uses Win32 services to authenticate the user. At step 401, the RPC session class 1157 (FIG. 4) invokes a CreateSession method of the client manager class 1210 (FIG. 5), passing the user credentials. At step 402, the client manager class 1210 invokes a CreateSession method of the client session class 1220, passing the user credentials for authentication. Once the user is authenticated, the session handle is returned to the client manager 1210 at step 403, which in turn passes that handle on all subsequent RPC calls.

At the start of each RPC call, the session handle is validated and the RPC thread impersonates the user represented by the handle. Beginning at step 404, the RPC session class 1157 invokes an authentication method in the client manager 1210, passing the session handle. Using the session handle, the client manager 1210 invokes an authentication method in the respective client session class 1220 at step 405. At step 406, the client session class 1220 invokes an LogonUser function of the operating system, here Microsoft Windows NT, to create a network user 900. At step 407, the client session class 1220 impersonates the logged-on user, and at step 408 ensures that the user has administrative privileges. At step 409, the client session class 1220 checks to make sure that the user has administrative privileges on all nodes of the cluster. When the user finishes, the client session class invokes a method, at step 410, to stop the impersonation.

Figure 7:
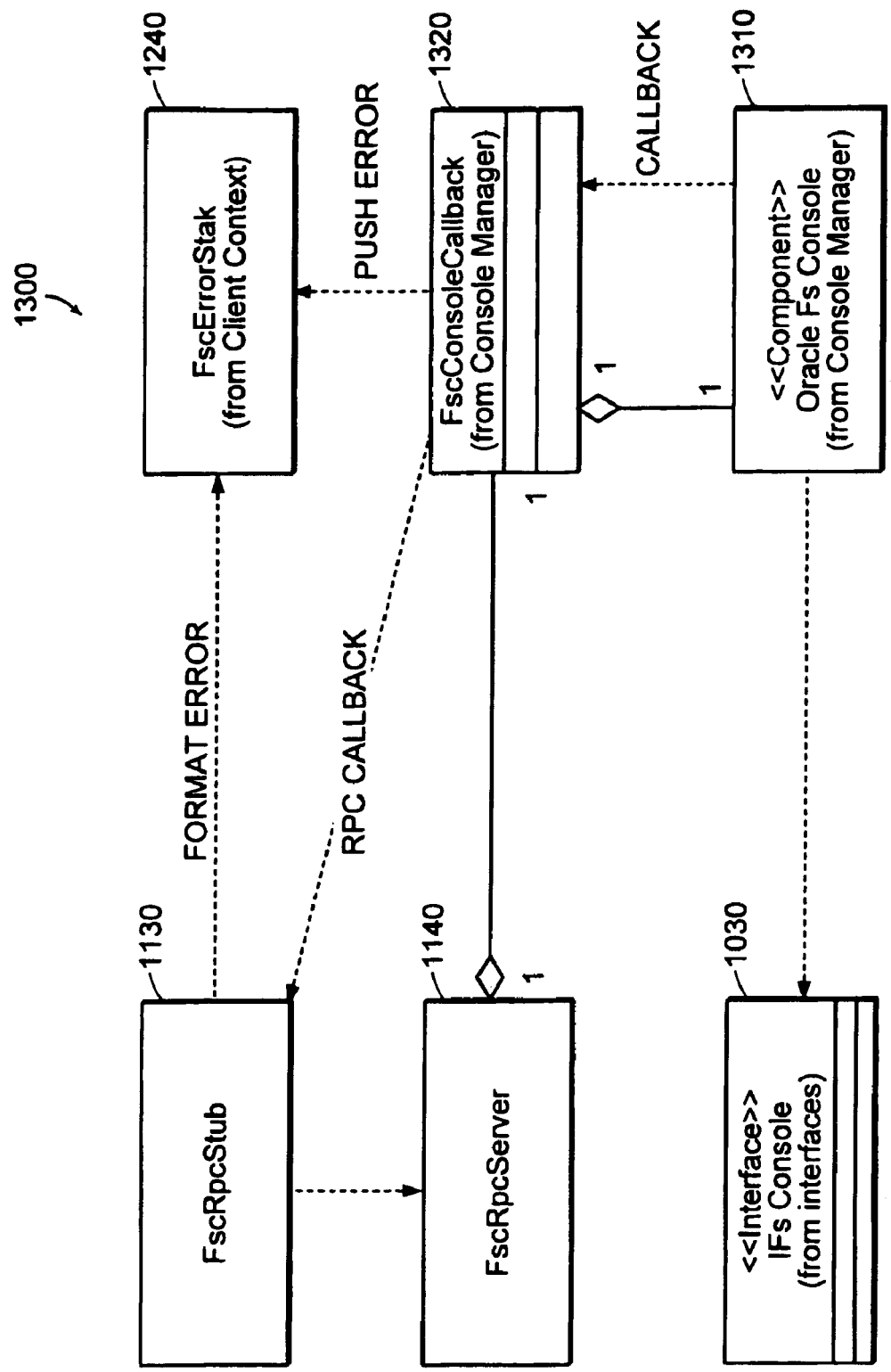
FIG. 7 is an object class diagram of the console manager 1300 of FIG. 3.

FIG. 7 is an object class diagram of the console manager 1300 of FIG. 3. The console manager 1300 includes both a console callback class 1320 and the console COM component 1310. The console component 1310 interacts with the user and reports errors. This code manages the context of a given RPC call, tying together the console, the error stack and the RPC stub.

The fail safe console's COM object realizes (implements) a console interface 1030. The console object interacts with the console callback class 1320 through a callback table, which essentially enables late binding. This allows the console object to be built and exist independent of the server. The fail safe services may be the only part of the server that knows about the RPC layer. The entire server and any resource plug-in can have access to the console object during the lifetime of an RPC call.

The console COM object can include a ReportError( ) function. As described below, the function can be used to report errors back to the console 1310.

Figure 8:
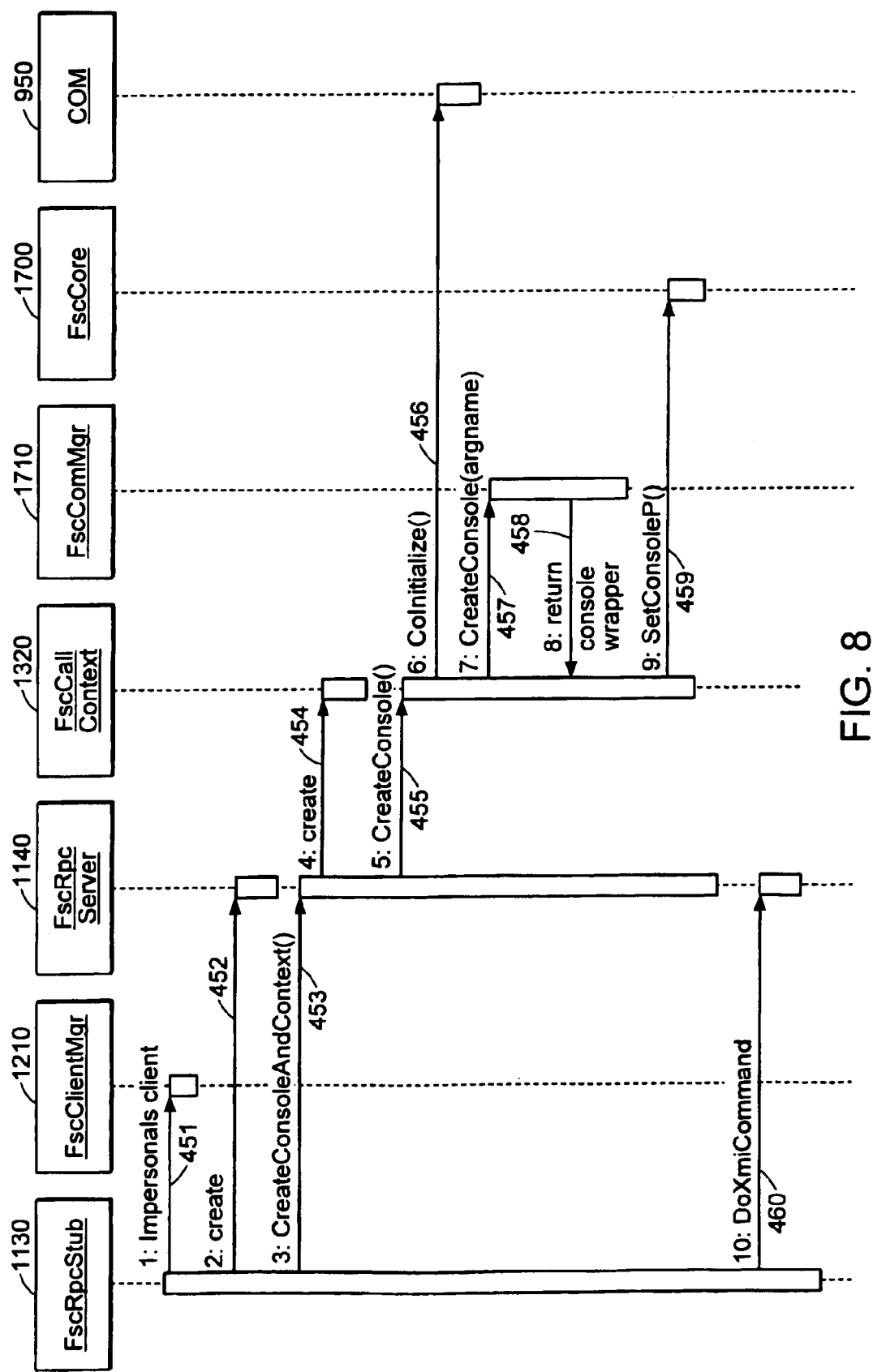
FIG. 8 is a flow diagram illustration RPC execution flow.

FIG. 8 is a flow diagram illustration RPC execution flow. All RPC calls have the same initialization sequence. Shown is the initialization sequence for an online group call.

First, at step 451, the RPC stub 1130 calls the client manager 1210 to impersonate the client. At step 452, the RPC stub 1130 calls the RPC server class 1140 to create an online group.

During initialization, at step 453, the RPC stub 1130 calls the RPC server class 1140 to create both the call context and the console object. In response, the RPC server class 1140 invokes the call context class 1320 to create the call context at step 454 and to create the console at step 455. At step 456, the call context class 1320 coinitializes the call context and the console COM objects to make the services available. At step 457, the call context class 1320 invokes a COM manager class 1710 from the core 1700 to create and manage the console COM object and return, at step 458, a console wrapper, which hides the COM details. Furthermore, the console interface pointer is registered with the fail safe core 1700, at step 459, so that it can be used by other objects.

Finally, at step 460, the RPC stub 1130 invokes the DoXmlCommand interface function 1025 of the RPC server class 1140.

Several of the functions performed by the fail safe server are distributed operations that execute across the entire cluster. The coordinator 1430 (FIG. 3) is responsible for executing and controlling the flow of those operations. In a particular embodiment, the coordinator's logic is built into the code. It should be understood that a data driven model can be used in which the coordinator 1430 processes an execution plan. The coordinator 1430, however, can be tailored for existing resources of forms, reports and existing databases.

Returning to FIG. 3, the backend component 1020 executes a segment of a distributed operation on a single node. The logic of the flow control details of the distributed operation is encapsulated in the backend component 1020. In other words, the coordinator 1430 tells the backend to do its work, not how to do it.

There can be several types of backend worker, provider, and core classes, one for each distributed operation. Most of the backend classes perform a multi-step task driven by the coordinator 1430. The other classes are stateless, processing all requests as independent work items. The type of class depends on the work being done.

Regardless of the type of work, there is one COM interface 1025 (FIG. 3) used to access any backend task. This approach limits the number of Distributed Component Object Model (DCOM) interfaces, thereby simplifying configuration and installation of the objects. The backend COM object can create the appropriate object in response to the first call made to the backend. All subsequent calls made to the backend COM object are delegated to the particular instance.

A side effect of this approach is that a backend COM object can only do one type of work. For example, the same worker may not be used to create a group and then verify a group. Such a constraint may not be an issue where the fail safe server does not have a high throughput requirement.

The fail safe server is a distributed system and, as such, it is important to detect and report errors in details. Furthermore, error messages must have context so that the user can deduce the exact nature of a problem. This is difficult to do using a single error status. For example, the "object not found" error is meaningless unless accompanied by information such as the object name, object type, computer name, facility accessing the object, the operation in progress, etc.

The fail safe server error handling system solves the above problem by providing an interface for reporting errors that can be accessed easily from anywhere in the server. The COM interface provides this service. External resource plug-ins are passed through this interface pointer at initialization. Code internal to the server always has access to the console via the error manger.

During the execution of a client request, errors can occur at various levels of the call frame inside various processes. The error stack 1240 provides a convenient method for reporting errors in great detail within any component of the server, on any node in the cluster. Each client connection includes an error stack 1240, which can include any number of errors for a given client request. Errors are accumulated in the stack until the client calls GetLastError( ) at which time the stack is cleared. The fail safe server gains access to the error stack indirectly by means of the console component.

Figure 9:
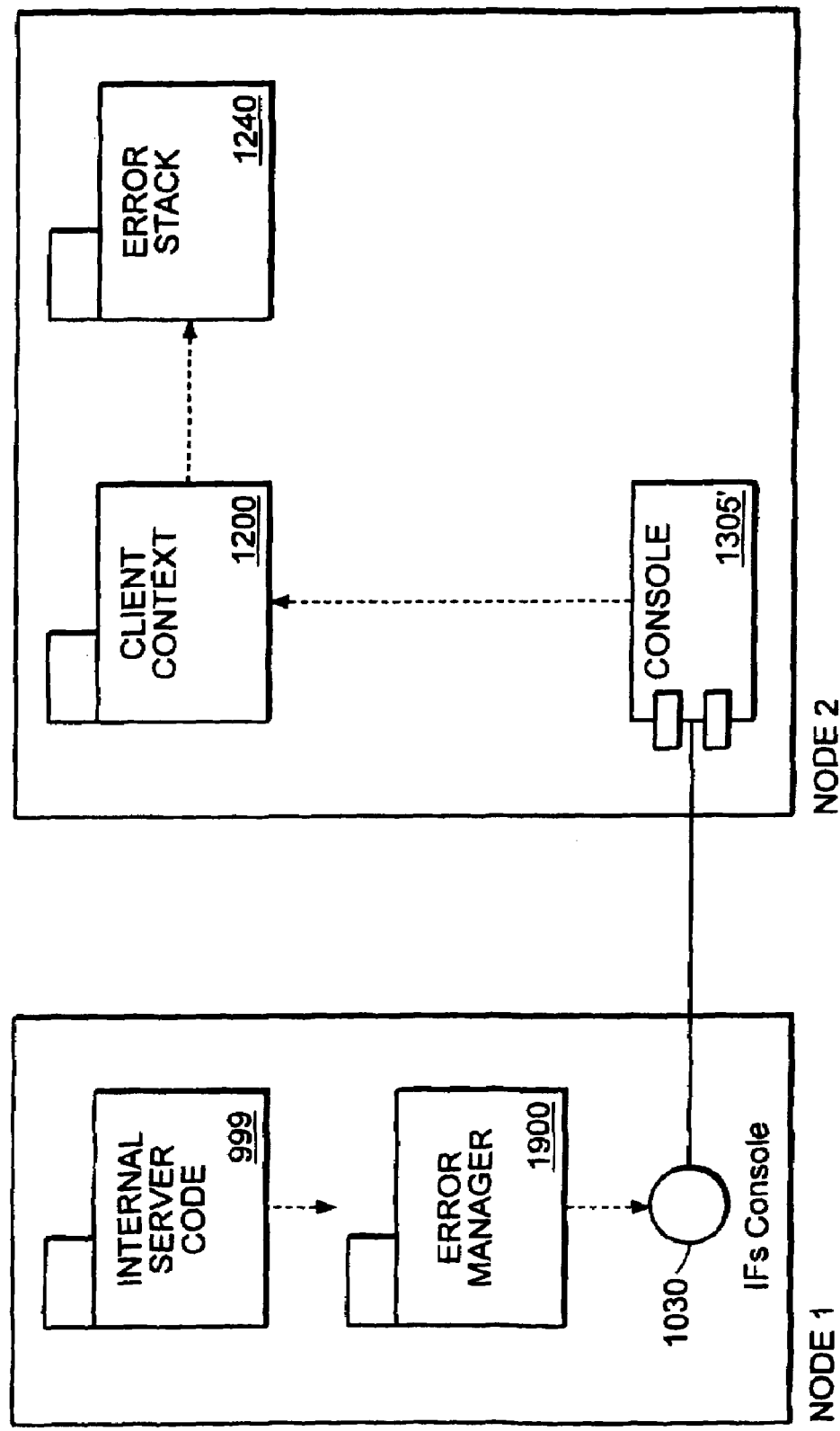
FIG. 9 is a block diagram of the component used for error reporting services.

FIG. 9 is a block diagram of the component used for error reporting services. An error manager 1900, the error stack 1240 and console COM object 1300' are all involved in the process of error reporting. When an error is detecting, the server calls the error manager 1900, which formats the error and the passes the error string to the console COM object 1305'. The error should be formatted on the system where it occurred to ensure that the correct error message is retrieved. It would not, for example, call the Win32 GetLastError( ) function on node 2 if the error occurred on node 1. It should be noted that the console object 1305' is always on the same node as the error stack, which is the master node to which the client is connected.

The error manager 1900 provides error formatting and reporting services to the server. All of the error manager functions are static, so that the server can report an error without having to create an error manager object. When a client request begins execution, the server creates the console COM object 1305' and passes the console interface pointer 1030 to the error manager 1900, which stores it in the thread local storage. So, when the error manager is called to report an error, the error manger 1900 always has access to the console interface pointer. Once the error manager formats an error, it then passes it off to the error stack 1240 through the console interface 1030.

Because the error manager 1900 formats errors, it needs to know the facility of the error so that it can look up the error correctly. In particular, facility codes are defined for fail safe internal errors, Win32 errors, Win32 cluster errors, Win32 COM errors, Win32 RPC errors, and other (e.g., unknown) errors. Other facility codes can also be defined. If the caller preformats the error, then the facility code is not needed. In that case, the caller can pass a single error string parameter to the report error function.

Figure 10:
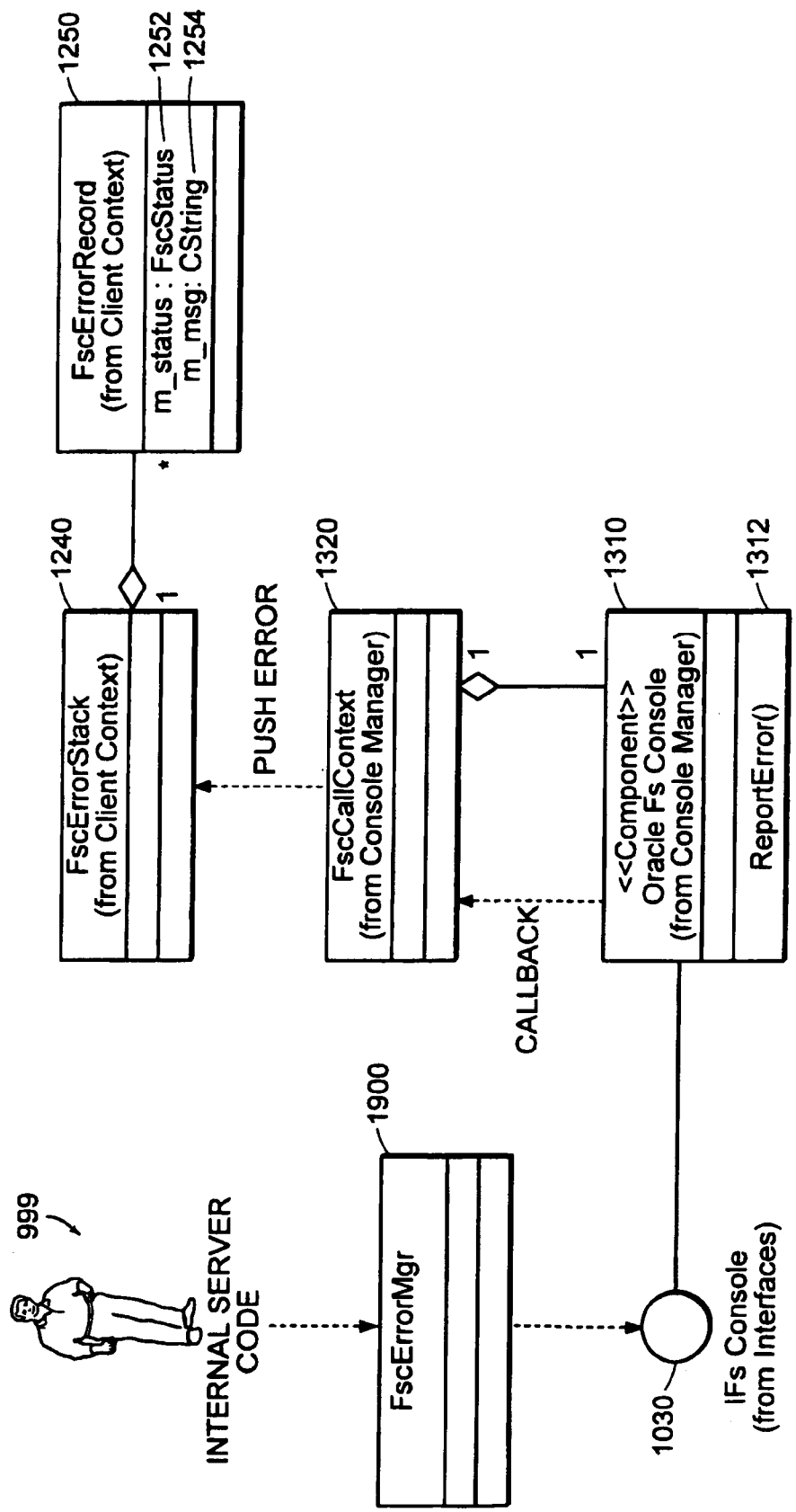
FIG. 10 is a block diagram showing class relationships for error reporting services.

FIG. 10 is a block diagram showing class relationships for error reporting services. When the server detects an error, it calls a static function in the error manager classes 1900 to report the error. The error manager class formats the error and then passes the error string to the console component 1310 in a cell to the ReportError function 1312 using a counsel interface pointer 1030. The console component 1310 calls back to the call context component 1320. The call context component 1320 pushes an error record 1250 onto the error stack 1240. As shown, the error record includes a status field 1252 and a message field 1254.

Figure 11:
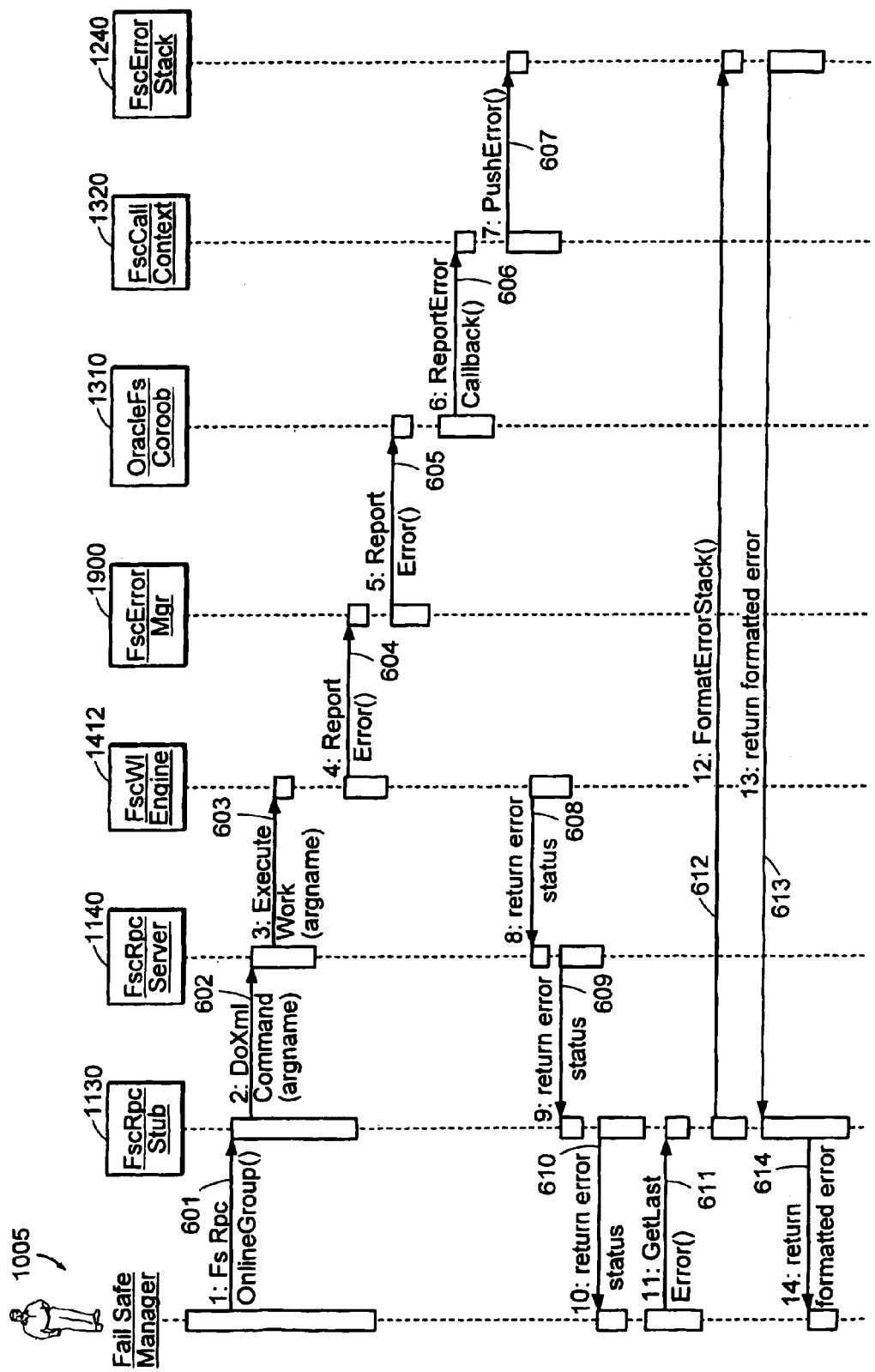
FIG. 11 is a flow diagram illustrating error flow.

FIG. 11 is a flow diagram illustrating error flow. The figure illustrates a scenario where a users brings a group online to demonstrate the flow of error handling in the system from the perspective of the client (fail safe manager). In summary, the server detects an error, pushes it on the stack and returns an error status to the client. The client then calls the server again to fetch the error stack. The error stack formats the error and returns it to the client.

In more detail, the fail safe manager calls the RPC stub 1130 at step 601 to create an online group. In response, at step 602, the RPC stub 1130 calls the RPC server class 1140, using the DoXmlCommand function 1025. The RPC server class 1140 then calls the workflow engine class 1412 at step 603 to finish creating the online group.

As shown, the cluster group class 1730 detects an error. At step 604, the cluster group class 1730 calls the ReportError function of the error manager 1900, which in turn calls the ReportError function of the console component 1310 at step 605. In response, at step 606, the console component 1310 performs a callback to the call context component 1320, which pushes the error onto the error stack 1240 at step 607.

The workflow engine class 1412 also returns the error to the RPC server class 1151 at step 608. The RPC server class 1151, at step 609, returns the error to the RPC stub 1130, which returns an error status to the fail safe manager 1005 at step 610.

At step 611, the fail safe manager 1005 calls the GetLastError function of the RPC stub 1130. In response, the RPC stub calls the error stack class 1240 to format the error at step 612. The formatted error is returned to the RPC stub 1130 at step 613. At step 614, the formatted error is returned by the RPC stub 1130 to the fail safe manager.

The error handling facility of the server permits the server to report detail errors at several layers. A layer can simple report an error and return the error status to the caller. The caller has the option of adding more detail by reporting another, higher level error.

Figure 12:
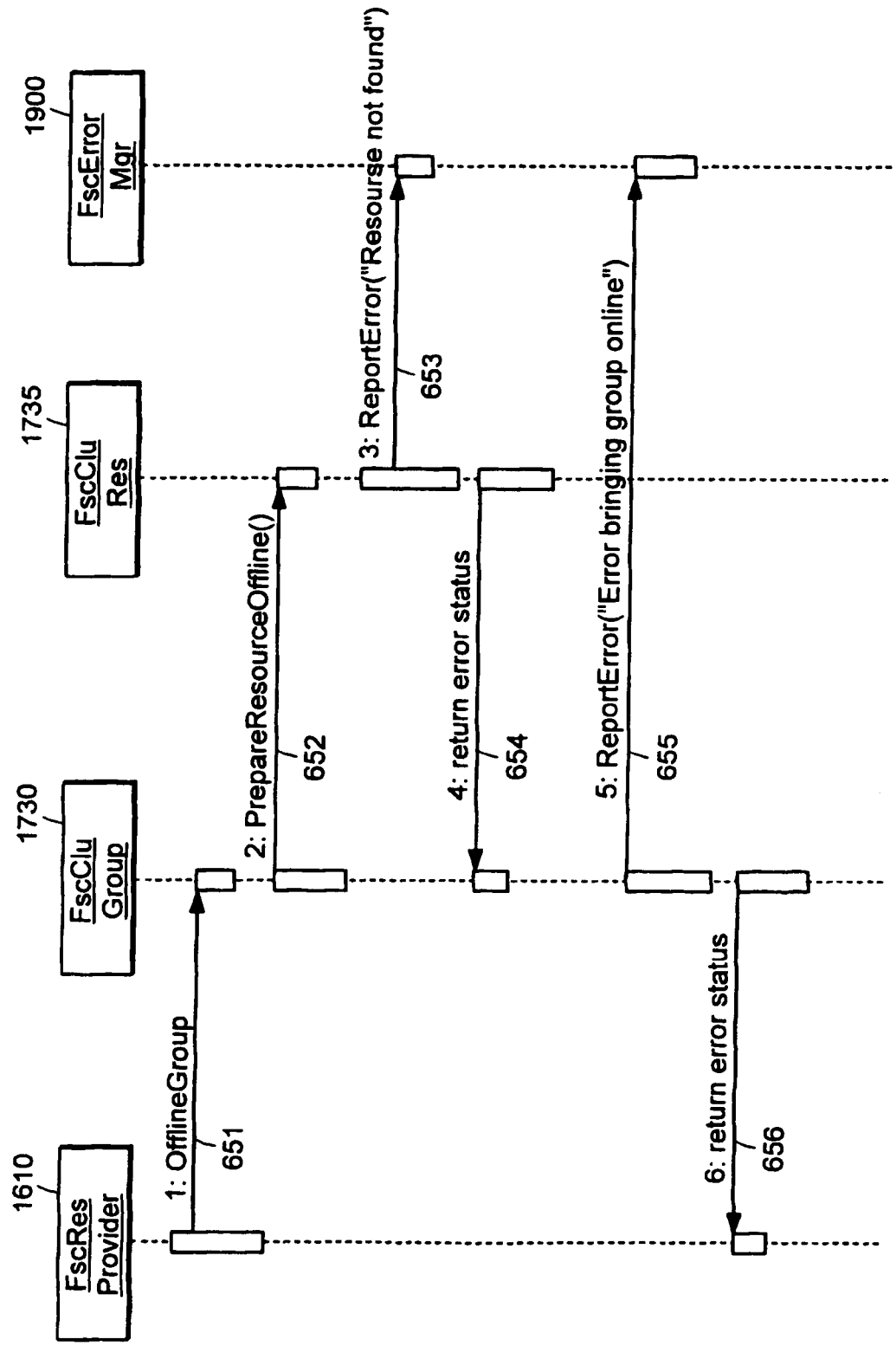
FIG. 12 is a flow diagram illustrating multiple error reporting.

FIG. 12 is a flow diagram illustrating multiple error reporting. Beginning at step 651, a resource provider class 1610 calls an offline group function of a cluster group class 1730. At step 652, the cluster group class 1730 calls a cluster group resource class 1735 to prepare an offline resource.

As shown, the cluster resource class 1735 fails to find the request resource. Consequently, at step 653, the ReportError function of the error manager class 1900 is called, passing the error message.

At step 654, the error status is also returned by the cluster resource class 1735 to the cluster group class 1730. The cluster group class 1730 then calls the ReportError function of the error manager 1900, passing the error message. The cluster group class 1730 then returns the error status to the resource provider class 1610.

In the illustrative example, the FscCluRes class instance reports an error because the resource is not found. The caller, FscCluGroup, provides more context to the error by reporting an online group error. The formatted error returned to the client by the error stack contains the group error followed by the resource error.

To have consistent error handling, it is important for the server to follow a set of guidelines. These guidelines are as follows:

Code inside the server should use a common call to FscErrorMgr::ReportError to report error. There can be several variations of this call. The resource plug-ins for the fail safe code may also use the FscErrorMgr because they link against core fail safe libraries. Third party resource plug-ins should use the IfsConsole pointer to report errors.

FscErrorMgr::ReportError may only be called in 2 cases:
1) the code is returning a new internal fail safe error
2) the code has reporting an external error (NT, OCI, UPI, SQLNET, etc)

If a function returns a status, it should always be an FscStatus. If the function received an error from an external source it should immediately push the error, then push a fail safe error which specifies the external call that was made. The following code shows an example:

```
Fscstatus
FscCluCluster::GetClusterInfo ( )
{
    FscStatus status;
    ntStatus = GetClusterInformation ( . . . );
    if (ntStatus != ERROR_SUCCESS)
    {
        FscErrorMgr::ReportError (eFacilityCluster,
        ntStatus);
        status =
        FscErrorMgr::ReportError
        (eFacilityFs,FS_ERROR_GETCLUSTERINFO) ;
    }
    return status;
}
```

The caller has the option of adding another error to the stack. In the sample below, FS_ERROR_OPEN_SESSION is reported and then returned from OpenSession.

```
FscRpcCluster::OpenSession ( . . . )
{
    status = FscCluCluster::GetClusterInfo ( . . . )
    if (status = IsError( ) )
    status = FscErrorMgr::ReportError (eFacilityFs,
    FS_ERROR_OPEN_SESSION
    return status;
```

It should be noted that the server reports errors at the proper level so that the errors are detailed enough to be meaningful. In other words, if the server calls an external interface such as Oracle Cluster Interface (OCI), it should report the error immediately after the OCI call rather than rippling the OCI error up the call stack, where the low level context can be lost.

One advantage of the system is that all layers of software can use the console without having to write communication software. Routing requests back to the client can be difficult, especially in a multi-thread environment. The console provides a simple synchronous call interface that has no network semantics whatsoever. Regardless of what component is calling the console, or where it is, the console can be easily reached.

When an error occurs, it is critical to report details regarding the exact problem. This is even more critical in a distributed system. With the disclosed system, error messages can be pushed onto an error stack, included in the console. Each layer of software or each software object has the option of adding further detail to the error stack. For example, if an error occurs at the OS level, the message is meaningless unless context is established. So, if error 5 (security error) is returned by the OS, the system allows calling objects to push additional errors such as "Error accessing the NT registry." Likewise, software further up on the call frame could push "Error configuring database information," and so on. Thus, the user will see a nice stack of errors that make sense.

The console also provides the ability to report ongoing status messages, which may be critical because some operations take a while to complete.

The console also provides the ability to ask the user a question and get back a response. So, instead of having to abort an operation because of an unexpected condition, the software can ask the user such questions as "the file exists, should it be overwritten."

Those of ordinary skill in the art should recognize that methods involved in a System for Distributed Error Reporting and User Interaction may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While the system has been particularly shown and described with references to particular embodiments thereof, it will be understood by those skilled in the art that various changes in form and details may be made therein without departing from the scope of the invention encompassed by the appended claims. For example, the methods of the invention can be applied to various environments, and are not limited to the environment described herein.

What is claimed is:

1. A system for interacting with a client in a distributed computing environment having a plurality of computing nodes interconnected to form a cluster, the system comprising:
    means for connecting a client to a master node of the cluster;
    means for associating a message list to the client on the master node;
    means for performing tasks for the client on a plurality of nodes of the cluster;
    means for detecting an event while performing one of the tasks;
    means for storing a message on the message list descriptive of the detected event;
    and means for communicating the message to the client.

2. The system of claim 1 wherein the event is detected on a node different from the master node.

3. The system of claim 1 further comprising, on the master node, an object unique to the client for interfacing with the client.

4. The system of claim 3 wherein the object is accessible across the cluster.

5. The system of claim 1 wherein a message code is formatted into a message string for communication to the client.

6. The system of claim 1 wherein a message code is formatted into a message string for storage on the message list.

7. The system of claim 1 wherein the message list is structured as a stack.

8. The system of claim 1 further comprising a fail safe module for failing over the master node to another node on the cluster in response to a failover event on the master node.

9. The system of claim 1 wherein the event is an error event.

10. The system of claim 1 wherein the event is a dialogue event.

11. A system for interacting with a client in a distributed computing environment having a plurality of computing nodes interconnected to form a cluster, the method comprising:
    means for connecting a client to a master node of the cluster;
    means for creating a distributed object on the master node to interface with the client;
    means for associating a client manager having a message list with the client on the master, node, wherein the message list is structured as a stack;
    in the client manager, means for tracking a plurality of contexts for the client, each context having a respective message list;
    means for performing tasks for the client on a plurality of nodes of the cluster;
    means for detecting an event while performing one of the tasks;
    means for storing a message on the message list descriptive of the detected event; and
    means for communicating the message to the client through the distributed object.

12. The system of claim 11 wherein the event is detected on a node different from the master node.

13. The system of claim 11 wherein a message code is formatted into a message string for communication to the client.

14. The system of claim 11 wherein a message code is formatted into a message string for storage on the message list.

15. The system of claim 11 further comprising a fail over module for failing over the master node to another node on the cluster in response to a failover event on the master node.

16. The system of claim 11 wherein the event is an error event.

17. The system of claim 11 wherein the event is a dialogue event.

18. The system of claim 11 wherein the distributed object is a synchronous call interface.

19. The system of claim 18 wherein the synchronous call interface does not require network semantics.

* * * * *